(12) United States Patent
Pawluczyk

(10) Patent No.: US 6,634,795 B2
(45) Date of Patent: Oct. 21, 2003

(54) FIBER OPTIC TERMINATION ASSEMBLY

(75) Inventor: Rafal Pawluczyk, Waterloo (CA)

(73) Assignee: P & P Optica Inc., Kitchener (CA)

( * ) Notice: Subject to any disclaimer, the term of this patent is extended or adjusted under 35 U.S.C. 154(b) by 0 days.

(21) Appl. No.: 09/726,043

(22) Filed: Nov. 30, 2000

(65) Prior Publication Data

US 2002/0064350 A1 May 30, 2002

(51) Int. Cl.[7] .................................................. G02B 6/40
(52) U.S. Cl. ........................................................ 385/54
(58) Field of Search ............................... 385/54, 59, 80, 385/65, 63, 83

(56) References Cited

U.S. PATENT DOCUMENTS 4,730,891 A * 3/1988 Poorman ................. 350/96.21
5,675,681 A * 10/1997 Chiaretti et al. ............. 385/59

FOREIGN PATENT DOCUMENTS

JP          6-222246        * 8/1994         ................. 385/54

* cited by examiner

Primary Examiner—Jean F. Duverne
(74) Attorney, Agent, or Firm—Bereskin & Parr

(57) ABSTRACT

The present invention provides a fiber optic termination assembly and a method for assembling such an assembly. A pair of like aperture-forming elements are arranged in a reciprocal fashion to form an aperture to contain a fiber optic bundle. The reciprocal arrangement of the like aperture-forming elements results in a desired positioning of the fiber optic bundle within the termination assembly. Improved tolerances permit adaptation of the termination assembly to applications in which only a few strands of optical fibers need to be arranged and positioned.

4 Claims, 10 Drawing Sheets

FIBER OPTIC TERMINATION ASSEMBLY

FIELD OF THE INVENTION

This invention relates to fiber optic termination assemblies and a method for arranging and positioning optical fibers.

BACKGROUND OF THE INVENTION

Fiber optic assemblies containing multiple optical fibers (i.e. a fiber optic bundle) are often used for light transmission in various applications for telecommunication and instrumentation in which light is collected at an emitter and transmitted to a receiver. Various designs for fiber optic termination assemblies for containing and positioning these fibers bundles have been proposed in the prior art, the main design consideration being optimal coupling in and out of the fiber optic bundle. The termination apertures used to arrange and position the fiber optic bundle may take various forms including round, square, rectangular, linear, and so on. Individual optical fibers within the bundles are generally loose except at the termination where they are arranged in a tightly packed structure (typically a hexagonal arrangement) in order to maximize light transmission efficiency. As the optical fibers may be very fine, the tolerances required to ensure proper positioning of the fiber bundles at the termination may be very high. With existing fiber optic termination assembly designs, achieving the high tolerances necessary for proper arrangement and positioning of the fiber bundles has been difficult. It is particularly challenging when fibers have to be arranged in a single tightly packed line as required, for example, in telecommunications applications involving wavelength multiplexing.

Thus, there is a need for a design for a fiber optic termination assembly which facilitates accurate arrangement and placement of the fiber optic bundles, and which is inexpensive to manufacture and assemble.

SUMMARY OF THE INVENTION

It is an object of the present invention to provide an improved fiber optic termination assembly which facilitates arrangement and positioning of optical fibers.

In a first aspect of the present invention, there is provided a fiber optic termination assembly for arranging and positioning a fiber optic bundle, comprising:
  (i) a pair of aperture-forming elements adapted to abut each other in a reciprocal fashion to form at least one aperture to contain said fiber optic bundle; and
  (ii) a sleeve adapted to receive said pair of aperture-forming elements;
whereby, the reciprocal arrangement of said pair of aperture-forming elements results in a desired positioning of said fiber optic bundle within said fiber optic termination assembly.

In one embodiment, each of said aperture-forming elements has an outer surface, at least first and second abutting surfaces, and at least a third opposing surface provided between said first and second abutting surfaces, the first and second abutting surfaces of one of said elements being reciprocally arranged to abut the second and first abutting surfaces respectively of the other of said elements.

In another embodiment, a protruding ridge is provided on at least one of said first and second abutting surfaces, and a corresponding recessed groove is provided on the other of said first and second abutting surfaces, whereby, in use, said protruding ridge and said recessed groove lock to determine the size of the aperture formed between said elements.

In yet another embodiment, a portion of the outer surface of each aperture-forming elements, on which a force may be applied opposite to a force which may be applied by the opposing surface, is recessed relative to an adjoining outer surface, so that, in use, said sleeve does not act to widen said aperture.

In another aspect, the present invention provides elements for a fiber optic termination assembly for arranging and positioning a fiber optic bundle, comprising:
  (i) a pair of aperture-forming elements, each of said elements providing an outer surface, at least first and second abutting surfaces, and at least a third opposing surface provided between said first and second abutting surfaces;
  (ii) wherein, said pair of aperture-forming elements are adapted to abut each other in a reciprocal fashion to form an aperture for arranging and positioning said fiber optic bundle.

In one embodiment, a protruding ridge is provided on at least one of said first and second abutting surfaces, and a corresponding recessed groove is provided on the other of said first and second abutting surfaces, whereby, in use, said protruding ridge and said recessed groove lock to determine the size of the aperture formed between said elements.

In another aspect, the present invention provides a method of assembling a fiber optic termination assembly for arranging and positioning a fiber optic bundle, comprising the steps of:
  (a) providing a pair of aperture-forming elements, each of said elements providing an outer surface, at least first and second abutting surfaces, and at least a third opposing surface, and arranging said elements in a reciprocal fashion about said fiber optic bundle;
  (b) arranging and positioning said fiber optic bundle between said abutting and opposing surfaces; and
  (c) bringing said aperture-forming elements together to secure said fiber optic bundle within an aperture formed between said elements.

In one embodiment, the method further comprises the step of preparing said optical fibers prior to bundling by cleaning and buffer-stripping said fibers.

In another embodiment, the method further comprises the step of inserting said pair of aperture-forming elements within a sleeve to secure said elements together.

In yet another embodiment, the method further comprising the step of securing said elements together using an adhesive.

An advantage of the present invention is that, by providing a pair of like aperture-forming elements which are arranged in a reciprocal fashion, proper positioning (i.e. centering) of the fiber optic bundle at the termination is ensured. Also, since the like aperture-forming elements can be manufactured simultaneously with the same mold or die, tight tolerances for the fiber optic bundle containing aperture can be achieved.

Another advantage provided by the present invention is that, due to the tight tolerances that can be achieved, very small apertures can be formed to precisely position even a few strands of optical fibers.

A further advantage is the mechanically simple fabrication method. The solution taught by the present invention is particularly advantageous when a single line of fibers is needed, which may have applications in spectroscopy, telecommunications, and laser beam multiplexing.

BRIEF DESCRIPTION Of THE DRAWING

For a better understanding of the present invention, and to show more clearly how it may be carried into effect, reference will now be made, by way of example, to the accompanying drawings which show a preferred embodiment of the present invention, and in which.

DETAILED DESCRIPTION OF THE INVENTION

As previously mentioned, the present invention is directed to a fiber optic termination assembly for arranging and positioning a fiber optic bundle.

Figure 1B:
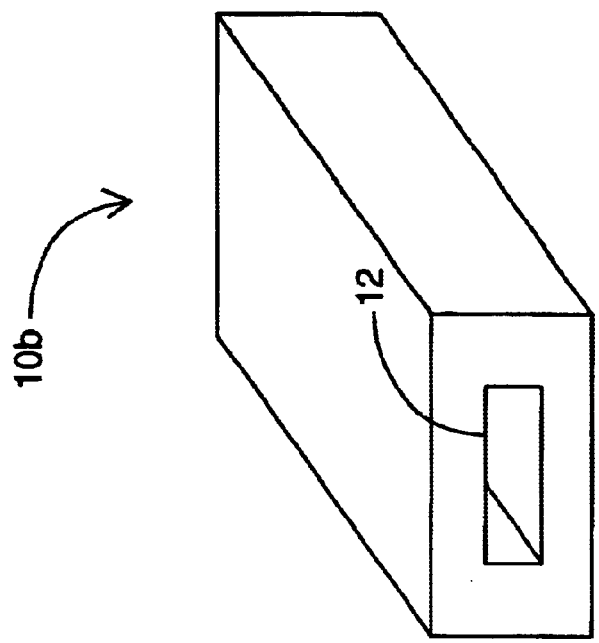
FIG. 1B shows an elongated rectangular aperture which is centred on the termination interface similar to the one shown in FIG. 1A but in which the outside shape of the termination assembly is generally rectangular rather than round.
Figure 1A:
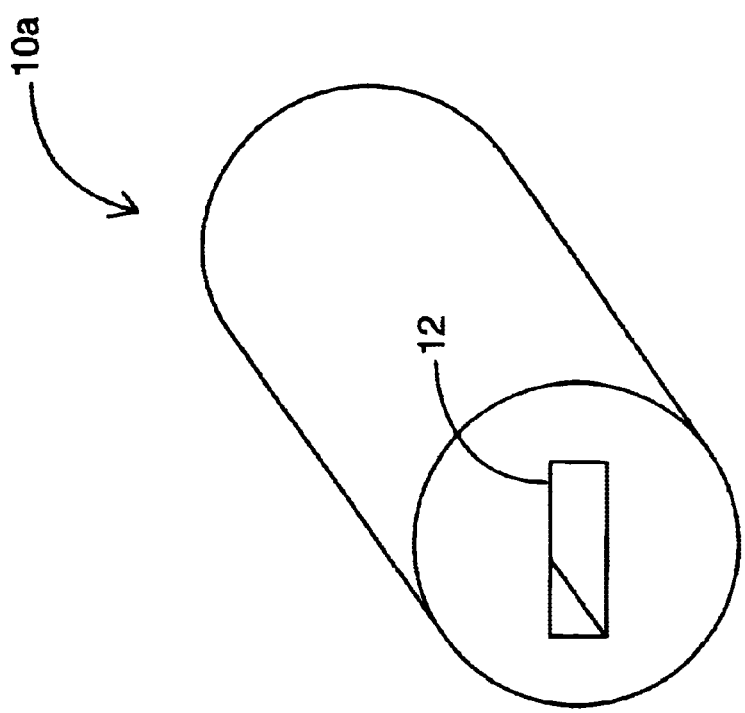
FIG. 1A shows a fiber optic termination assembly of the invention with an elongated rectangular aperture which is centred on the termination interface.

FIGS. 1A and 1B show examples of fiber optic termination assemblies 10a, 10b each having an elongate rectangular aperture 12. FIGS. 1A and 1B also illustrate that the outside shape of the assembly can be of any suitable shape and may be flat or curved.

The shape of the aperture 12 is determined by several factors including the degree of packing required for the optical bundles (not shown) and the optimal shape of the input or output beam for a given spectroscopic application. For example, in spectrograph instruments, the optimal input beam may be in the shape of the elongate rectangular aperture 12 shown in FIGS. 1A and 1B. The use of such shaped apertures can reorganize fiber optic bundles between the input and output terminations. For example, the input aperture may be circular in shape while the output aperture may be an elongate rectangular shape. This flexibility facilitates building spectroscopic systems in which light is collected and utilized optimally. This flexibility can also be useful in telecommunication applications using fiber optic bundles. Also, where multiple connections are required between two points, precise positioning of fiber optic bundles within termination assemblies assists in minimizing signal loss or degradation at the connections.

Figure 2:
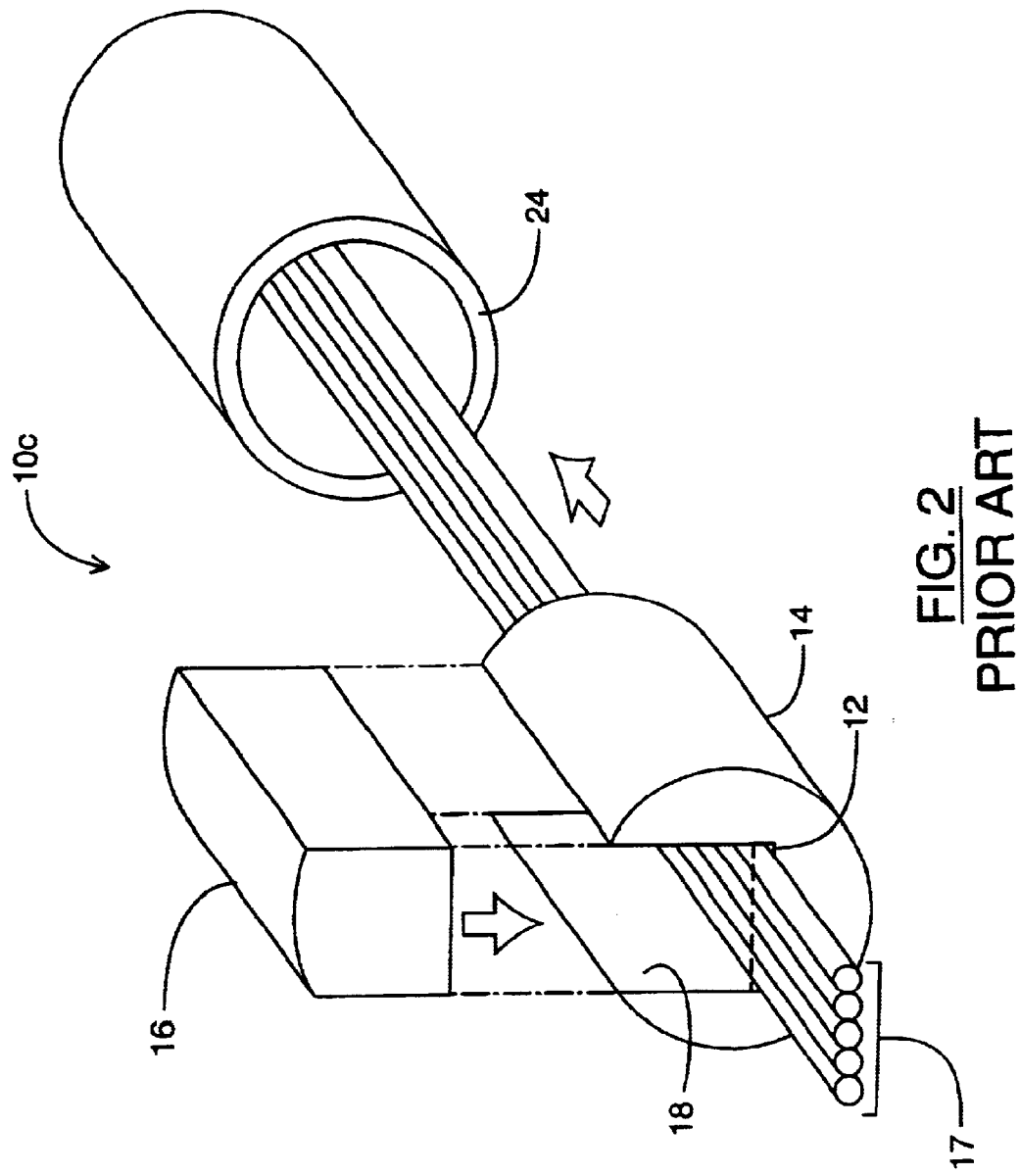
FIG. 2 shows an example of a prior art design in which one of the elements is a key which fits into a slot formed in a larger cooperating element.

Now referring to FIG. 2, a prior art design for a fiber optic termination assembly generally referred to by reference numeral 10c is shown in exploded view. In this example, two elements 14, 16 fit together to form the elongate rectangular aperture 12. A slot 18 is formed into the main element 14 and suitably shaped to receive the second element 16 in a key-shot arrangement. As shown in FIG. 2, a bundle of optical fibers 17 is laid flat at the bottom of the slot 18. The second element 16 is then fitted into the slot 18 and, when it is properly positioned, forms the upper part of the elongate rectangular aperture 12. Both elements 14, 16 are then fitted into a sleeve 24 which acts to keep the elements 14, 16 together, and to position the bundle of optical fibers 17.

Figure 3:
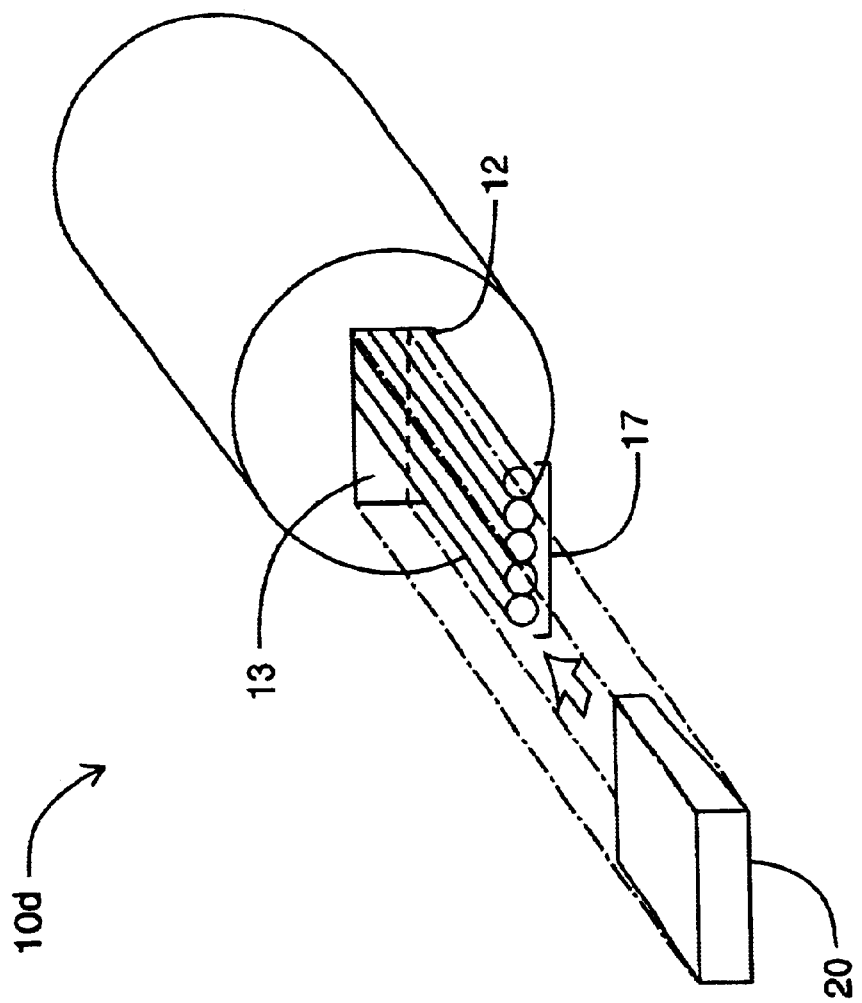
FIG. 3 shows an example of another prior art design, in which a small wedge element is inserted into a larger aperture containing an optical fiber bundle.

Now referring to FIG. 3, another prior art design for a fiber optic termination assembly is shown and generally referred to by reference numeral 10d. In this design, a bundle of optical fibers 17 are laid flat against the bottom of a rectangular aperture 13 which is larger than the intended aperture 12. A wedge-shaped element 20 is inserted in the space above the optical fiber bundle 17 until the bundle 17 is secured. Similar to the second element 16 of FIG. 2, the wedge-shaped element 20 forms the upper part of the elongate rectangular aperture 12 of the fiber optic termination assembly 10d.

While the designs shown in FIG. 2 and FIG. 3 would be adequate if the elements could be manufactured precisely, because of the small size of the optical fibers and the elements, achieving tight tolerances may be difficult and it may not be possible to achieve accurate centering of the fiber optic pattern in the completed termination assembly 10c, 10d. This may make precise connection to other components (not shown) more difficult.

Figure 4:
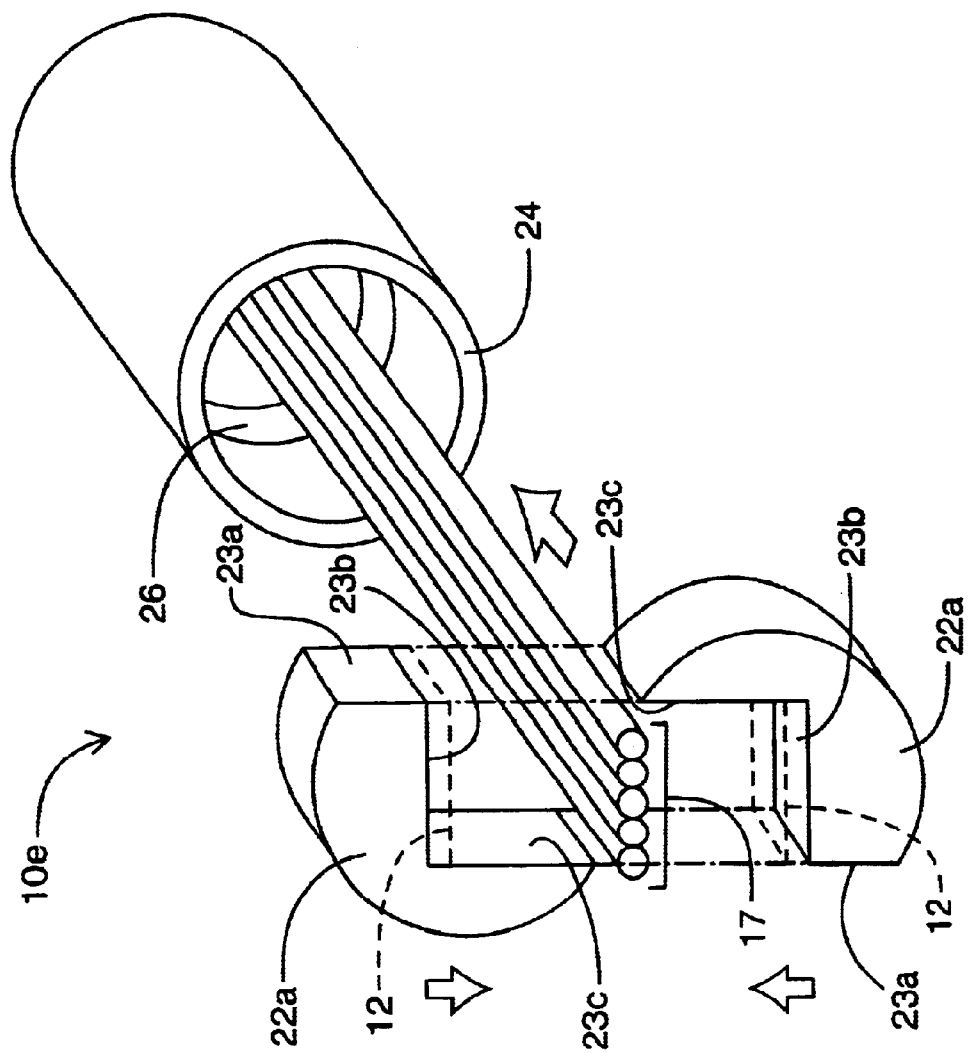
FIG. 4 shows a preferred embodiment of the present invention in which a pair of aperture-forming elements are arranged in a reciprocal fashion and used to arrange and position an optical fiber bundle within a fiber optic termination assembly.

Now referring to FIG. 4, a preferred embodiment of a fiber optic termination assembly according to the present invention is shown and generally referred to by reference numeral 10e. In order to overcome the limitations in the prior art designs shown in FIGS. 2 and 3, a pair of aperture-forming elements 22a are arranged in a reciprocal fashion to secure an optical fiber bundle 17. As mentioned, the two aperture-forming elements 22a are alike, one of the aperture-forming elements 22a simply being rotated 180 degrees about the optical fiber bundle 17, relative to the other element 22a. In the embodiment shown in FIG. 4, the two aperture-forming elements 22a each have cooperating surface features 23a and 23c which slidably abut each other when the aperture-forming elements 22a are being brought together. Other cooperating surfaces will be readily apparent to those skilled in the art and all such variations are within the scope of this invention. Each of the aperture-forming elements 22a have a third surface 23b which, when elements 22a are together, provide opposing surfaces to hold the optical fiber bundle 17 in position. When the two aperture-forming elements 22a are fully positioned, an elongate rectangular aperture 12 is formed, and the optical fibers 17 are held securely within the aperture 12. In a preferred embodiment, once the two aperture-forming elements 22a are fully positioned relative to each other, they are inserted into a sleeve 24 which acts to keep the elements 22a together. As shown in FIG. 4, a shelf 26 may be provided to prevent the elements 22a from being inserted too far into the sleeve 24.

Preferably, the two aperture-forming elements 22a of FIG. 4 may be manufactured simultaneously, using the same mold or mechanical tools or dies. As will be readily appreciated by those skilled in the art, possible materials which may be used to form the elements include a variety of plastics and metals. In addition, the present invention is not intended to be limited by the materials or method of manufacture. For example, possible manufacturing processes include machining, molding, extrusion, etc. If an extrusion process is being used, the pair of elements 22a may be cut from the same length of extrusion. The reciprocally arranged pair of like aperture-forming elements 22a ensures that the fiber optic bundle 17 is properly centred within the completed fiber optic termination assembly. As it is no longer necessary to worry about the tolerances of two different elements which fit together, the aperture-forming elements of the present invention are significantly easier to fabricate and assemble.

It has been found that, because the elements according to the present invention fit within high tolerances relative to each other, the design adapts itself very well to very fine fiber optic bundles. For example, the inventor has experimented and demonstrated a linear array of a fiber optic bundle consisting of 14 fibers of 70 microns in diameter. The actual aperture achieved was 70 microns by 980 microns, and the optical fibers were positioned to within 10 microns of their intended positions within the aperture. As the optical fibers were positioned generally parallel to each other during the assembly of the fiber optic termination, the problem of fiber skew in a final assembly was eliminated.

Even a larger number of smaller fibers may be arranged in the same way, as may be required in dense wavelength division multiplexing and demultiplexing (DWDM) applications, for example. In order to achieve this, the spacing between adjacent channels dispersed by the diffraction grating must correspond to the spacing between the cores of single mode fibers used, and thus the diameter of these fibers. Typically, telecommunications applications require the use of standard (125 micron diameter) fibers in which a single mode core is less than 10 microns in diameter. This reduces the number of possible channels available within a given telecommunications band. Hence, single mode fibers with a smaller outer diameter have to be used to achieve denser channel packing. A significant reduction in the diameter of a single mode fiber can be achieved by reducing the cladding diameter from the standard 125 microns to the minimum diameter required to preserver guiding of the single mode with acceptable losses.

Figure 5:
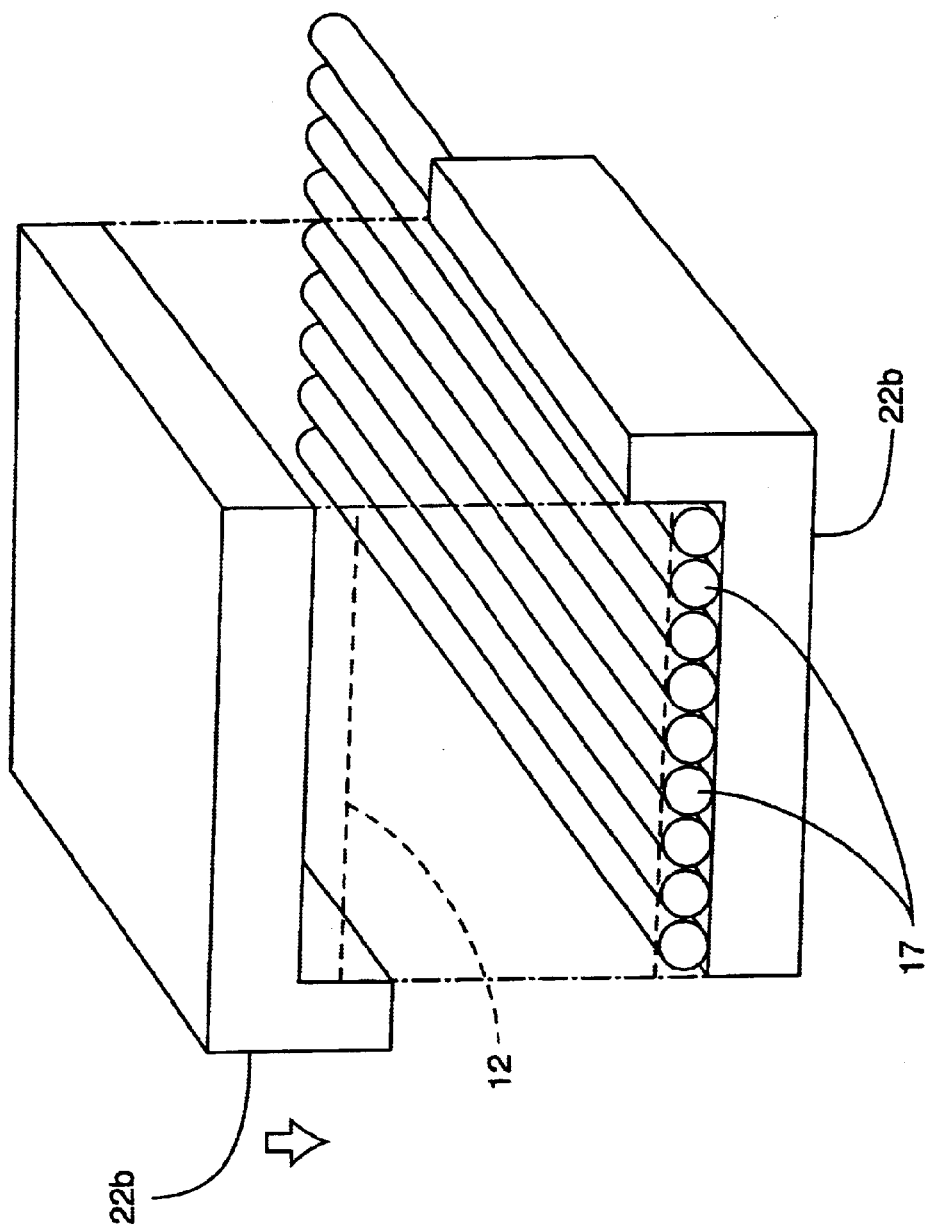
FIG. 5 shows an alternative embodiment of the present invention in which the pair of aperture-forming elements have flat outer surfaces rather than rounded outer surfaces.

Now referring to FIG. 5, an alternative embodiment of the present invention is shown in which a pair of aperture-forming elements 22b are arranged in a reciprocal fashion to form an elongate rectangular aperture 12 similar to that shown in FIG. 4. However, in FIG. 5, the elements 22b have flat outer surfaces. When the pair of elements 22b are fully positioned relative to each other, the final termination assembly has a generally rectangular shaped cross-section. A suitably shaped sleeve (not shown) can be used to keep the two elements 22b together.

Figure 6A:
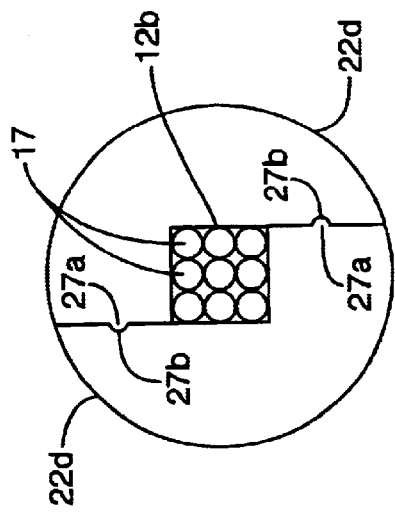
FIGS. 6A–6D show various alternative embodiments of the present invention in which various shapes of the pair of aperture-forming elements are shown.

Now referring to FIGS. 6A–6D, various alternative embodiments of the present invention are shown in which the shape of the aperture-forming elements is changed. In the examples shown in FIGS. 6A–6D, the pair of aperture-forming elements are referred to respectively by reference numerals 22c, 22d, 22e and 22f. As shown in FIG. 6A, the aperture 12a which is formed need not be the elongate rectangular aperture which has been described so far. FIG. 6A shows by way of example of a different aperture shape, a hexagonal aperture 12a which is formed by a pair of aperture-forming elements 22c with suitably shaped cooperating surfaces (comprising abutting surfaces and opposing surfaces). As shown in FIG. 6A, the fiber optic bundles 17 are tightly bundled together in a hexagonal structure. The number of optical fibers shown is for illustration only and is not determinative of the number of optical fibers which can be held together in a similar structure.

Still referring to FIG. 6A, a portion of the aperture-forming elements 22c has been cut away or recessed and the resulting recessed portion is indicated by reference numeral 23. The purpose of the recessed portion 23 is to ensure that the fiber optic bundle 17 is tightly packed within the aperture 12a formed by the cooperating elements 22c, when the elements 22c are placed within a sleeve (not shown). If, instead of a recessed portion 23, a portion of the elements 22c extended outwards relative to the immediately adjoining surface of the reciprocal element 22c (as indicated by dotted outline and referred to by reference numeral 25), the cooperating elements 22c may not be able to keep the fiber optic bundle 17 tightly together, since a sleeve (not shown) will act on the extending portions 25 to make the aperture 12a wider. Providing a slight recess 23 would avoid such a problem. However, if relatively tight tolerances can be achieved in the manufacturing process, it would be sufficient that the cooperating outer surfaces of the reciprocal pair of elements 22c fit relatively flush adjacent each other, as illustrated by example in FIGS. 6B, 6C and 6D.

Figure 6B:
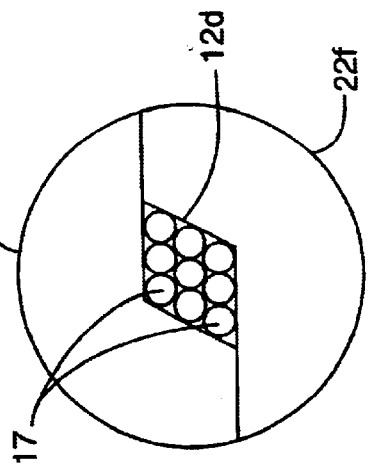
Figure 6C:
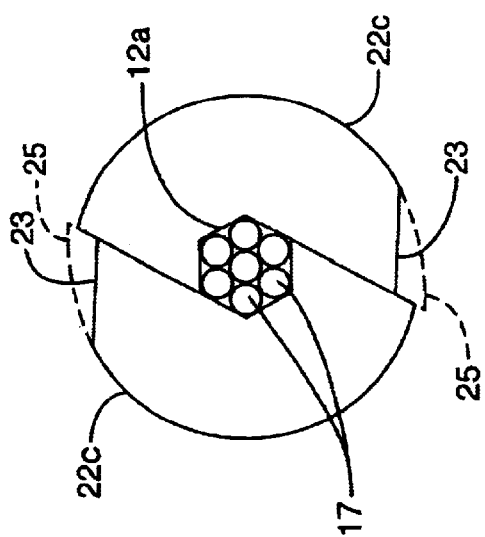
Figure 6D:
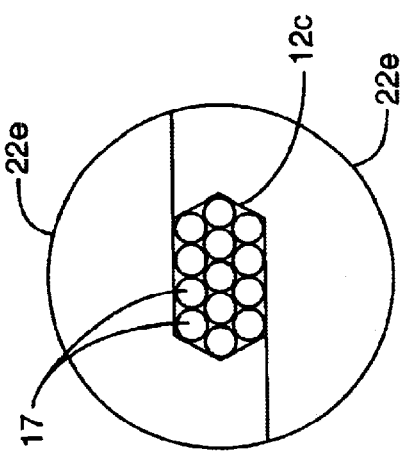

In FIGS. 6B, 6C, and 6D, various other shapes for the cooperating aperture-forming elements 22d, 22e, and 22f are shown which form apertures 12b, 12c, and 12d, respectively. In each case, the centering of the fiber optic bundle 17 in the completed fiber optic termination assembly is ensured by the reciprocally arranged like elements 22d, 22e and 22f. The shape of the apertures 12b, 12c and 12d will be determined by the particular application.

In FIG. 6B, optional ridges 27a and corresponding grooves 27b may be provided on abutting surfaces to facilitate locking of the pair of elements 22d. In this embodiment, the ridges 27a and grooves 27b determine the size of the aperture 12b and help to keep the elements 22d in position while they are being fitted into a sleeve (not shown). Such a ridge-groove arrangement may be used alone or in combination with the recessed outer surfaces described in FIG. 6A.

Various embodiments of the aperture-forming elements according to the present invention have been shown and described with reference to FIGS. 4–6D. Regardless of the shape of the aperture or the shape of the aperture-forming elements, the assembly procedure is essentially the same. Referring to FIG. 4, first, the multiple optical fibers comprising the bundle 17 are prepared as required (i.e. cleaned, buffer-stripped, etc.). The optical fibers are then collected together to form a bundle 17. The optical fibers are then aligned and pinched between a pair of aperture-forming elements 22a. As described previously, the pair of elements 22a are and arranged in a reciprocal fashion to form an aperture 12 in which the fiber optic bundle 17 is held. As the elements 22a are squeezed together gradually, any optical fibers which are crossing are straightened out to get an even alignment of the optical fibers. The pair of elements 22a which are now pinching the fiber optic bundle 17 between them may then be inserted into an appropriately sized sleeve 24 which acts to keep the elements 22a together. The sleeve 24 and/or the elements 22a may be made of slightly resilient material (e.g. plastic) so that a relatively tight force-fit can be achieved. Also, a slightly resilient element 22a may help to prevent damage to the optical fibers which are pinched between them.

If desired, the entire assembly can be fixed permanently together using an appropriate adhesive. This adhesion step may be performed for the two elements 22a prior to inserting the elements into the sleeve 24. Alternatively, the adhesion step may be performed after the elements 22a have been fitted into position within the sleeve 24. The assembly procedure for the alternative embodiments shown in FIG. 5 and in FIGS. 6A–6D are substantially similar.

Figure 7B:
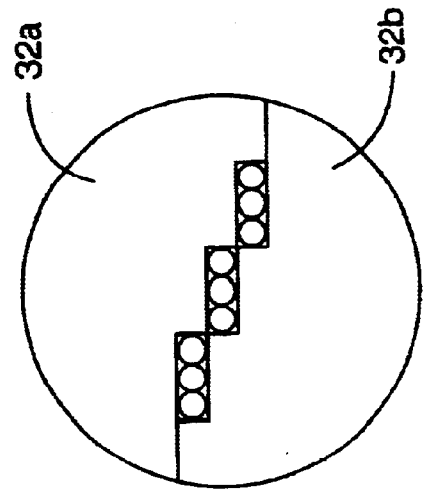
FIGS. 7A–7C show various alternative embodiments of aperture-forming elements of the present invention having multiple apertures.
Figure 7C:
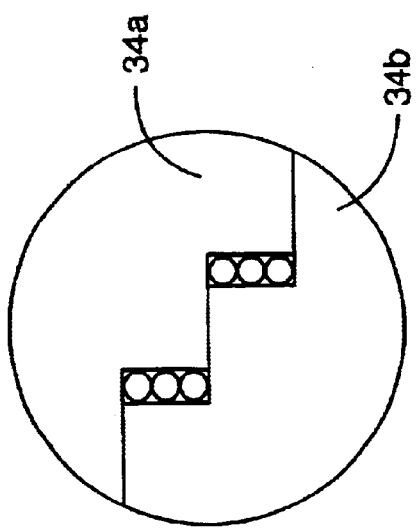
Figure 7A:
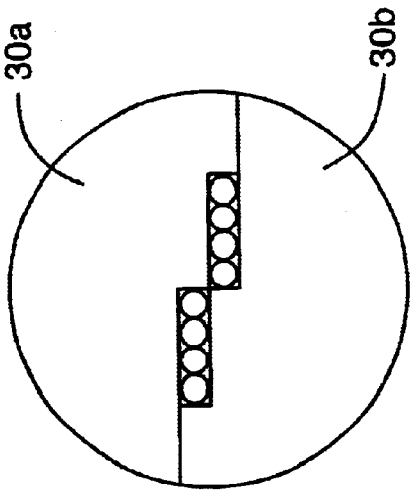

Now referring to FIGS. 7A–7C, various alternative embodiments of the pairs of aperture-forming elements are shown in which each pair 30a, 30b; 32a, 32b; 34a, 34b forms multiple apertures. In each case, the reciprocal arrangement of the pairs 30a, 30b; 32a, 32b; 34a, 34b results in a balancing of the multiple apertures about the center of the reciprocally arranged pair 30a, 30b; 32a, 32b; 34a, 34b.

Figure 8:
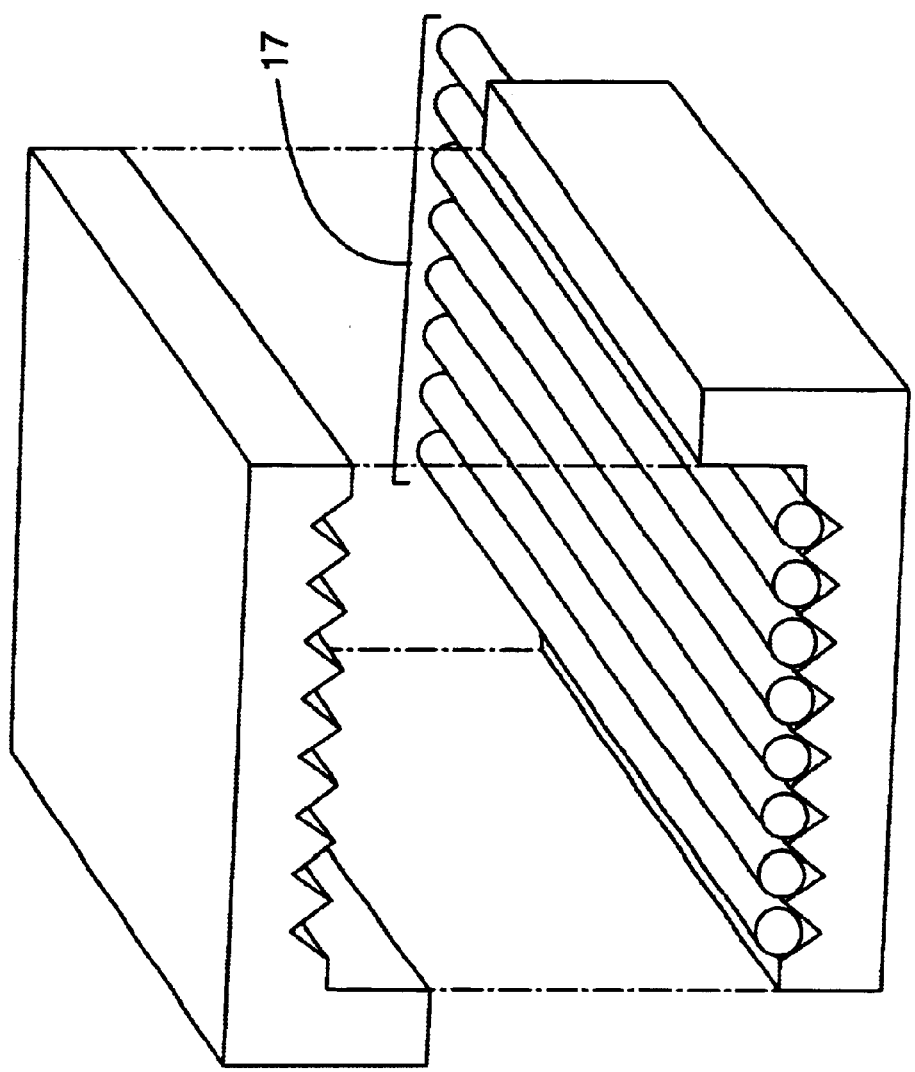
FIG. 8 shows an alternative embodiment of aperture-forming elements having an array of grooves for positioning an array of fibers.

Now referring to FIG. 8, there is shown an alternative embodiment of an aperture forming element having an array of grooves 36 for positioning an array of fibers. The grooves 36 help to keep the fibers evenly spaced apart. The grooves 36 are appropriately sized to fit and contain desired fiber diameters.

In the embodiments described above, the fibers are evenly spaced within the termination. However, this may not be appropriate for all applications. Take, for example, DWDM applications. Diffraction gratings disperse wavelengths in a non-linear fashion, i.e., the linear distance between different wavelengths of the dispersed spectrum varies with wavelength. On the other hand, DWDM channels are identified by the ITU (International Telecommunications Union) standard and are specified using even frequency spacings, which also result in a nonlinear arrangement of channel wavelengths.

Figure 9B:
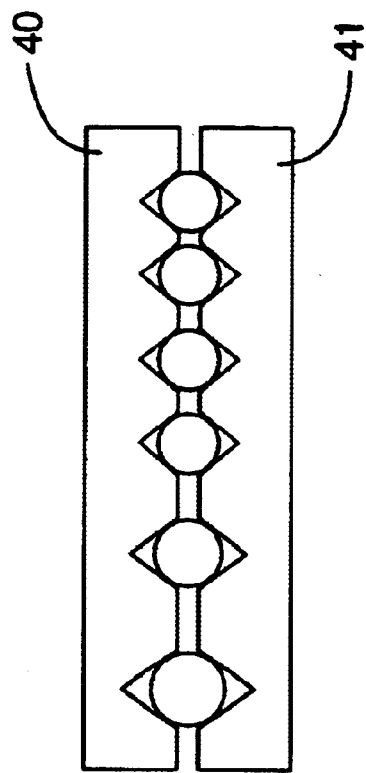
FIGS. 9A and 9B show aperture forming elements for fibers having variable diameters or variable spacing.
Figure 9A:
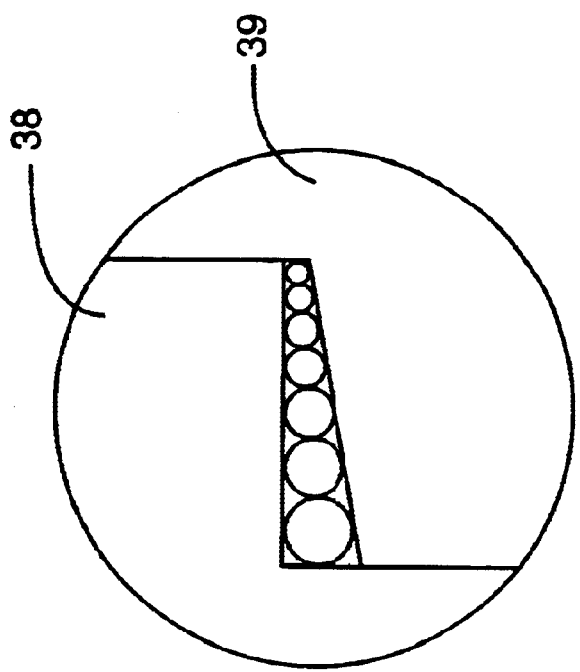
Figure 10E:
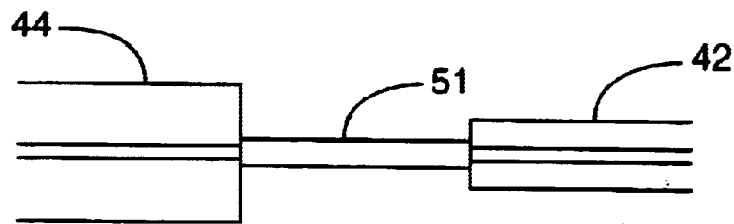
FIGS. 10A–10E show various methods of coupling single mode fibers of reduced cladding diameter to standard (125 micron) fibers.
Figure 10A:
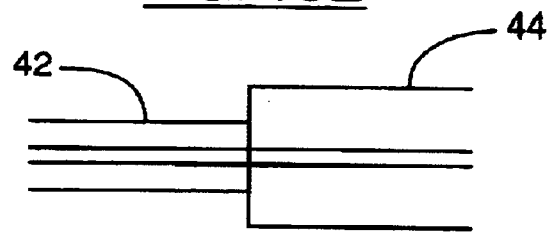
Figure 10B:
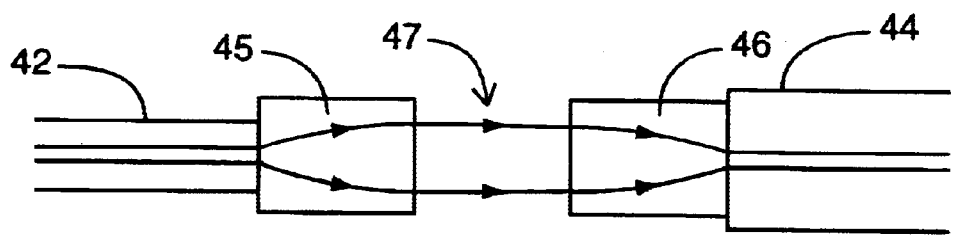
Figure 10C:
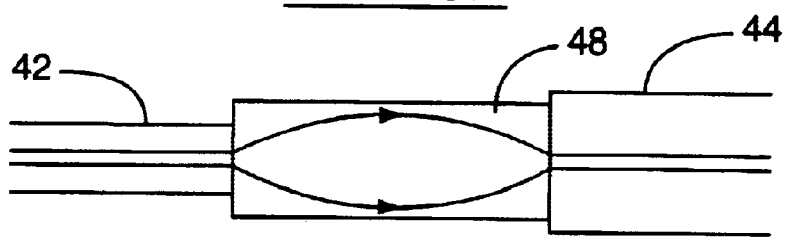
Figure 10D:
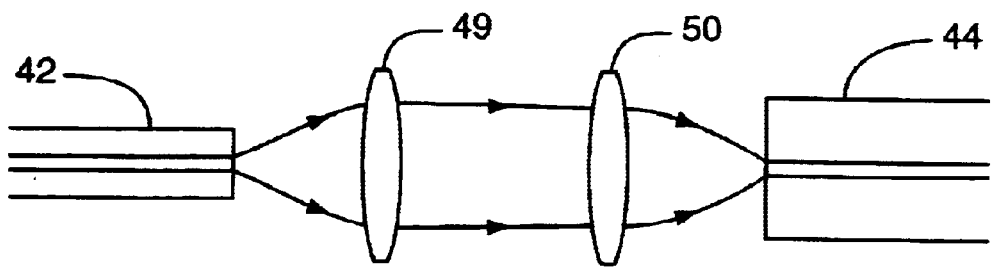

Thus, to match different DWDM channels within the dispersed spectrum produced by the diffraction grating with their corresponding fibers, fiber spacing would have to be controlled. This can be achieved by varying the diameters of single mode fibers employed in the termination. An illustrative example is shown in FIGS. 9A and 9B. In FIG. 9A, it will be seen that the reciprocal nature of the aperture forming elements 38, 39 is lost, since one of the aperture dimensions is variable to accommodate the different diameter fibers.

An alternative way of achieving variable spacing between the fibers is shown in FIG. 9B, which shows a variable spacing groove array formed by a pair of like elements 40, 41. As shown, the grooves are variably spaced. In this case, the elements 40, 41 are not reciprocally arranged but, rather, are arranged as mirror images. This alternative embodiment incorporating variable fiber spacing could also be applied when light is collected from demultiplexers or delivered to multiplexers using waveguide arrays produced by integrated optical means.

Referring now to FIGS. 10A–10E, in any of the above embodiments, where fibers having reduced cladding diameter fibers 42 need to be coupled to standard (125 micron) fibers 44, several methods of coupling are possible, including: (FIG. 10A) direct (butt) coupling or fusion spliced; (FIG. 10B) fused gradient index optics 45,46 and free space 47 propagation; (FIG. 10C) coupling using index-matched gradient index (GRIN) optics 48; (FIG. 10D) free space propagation with focussing lenses 49,50; and (FIG. 10E) integrated optics using a waveguide 51.

While various embodiments of the present invention have been shown and described in reference to the Figures, it will be obvious to those skilled in the art that various modifications and alterations may be made without departing from the scope of the invention which is defined by the following claims.

I claim:

1. A fiber optic termination assembly for arranging and positioning multiple optical fibers of a fiber optic bundle, comprising:

(a) a pair of aperture-forming elements adapted to abut each other in a reciprocal fashion to form at least one aperture to contain the optical fibers of said fiber optic bundle, said aperture-forming elements being substantially alike, each of said aperture-forming elements providing an outer surface, at least first and second abutting surfaces, and at least one third opposing surface provided between said first and second abutting surfaces, wherein the first and second abutting surfaces of one aperture-forming element slidably abut the second and first abutting surfaces respectively of the other aperture-forming element and wherein each third opposing surface of one aperture-forming element opposes a third opposing surface of the other aperture-forming element in positioning said pair of aperture-forming elements in a reciprocal arrangement; and (b) a sleeve adapted to receive said pair of aperture-forming elements;

whereby, the reciprocal arrangement of said pair of aperture-forming elements in said sleeve results in a centering of said fiber optic bundle within said fiber optic termination assembly.

2. The fiber optic termination assembly claimed in claim 1, wherein, a portion of the outer surface of each aperture-forming element is recessed relative to an adjoining outer surface, so that, in use, said sleeve does not act to widen said aperture.

3. Elements for a fiber optic termination assembly for arranging and positioning multiple optical fibers of a fiber optic bundle, comprising:

(i) a pair of aperture-forming elements adapted to abut each other in a reciprocal fashion to form at least one aperture to contain the optical fibers of said fiber optic bundle, said aperture-forming elements being substantially alike, each of said aperture-forming elements providing an outer surface, at least first and second abutting surfaces, and at least a one third opposing surface provided between said first and second abutting surfaces;

(ii) wherein, the first and second abutting surfaces of one aperture-forming element slidably abut the second and first abutting surfaces respectively of the other aperture-forming element and wherein each third opposing surface of one aperture-forming element opposes a third opposing surface of the other aperture forming element in positioning said pair of aperture-forming elements in a reciprocal arrangement.

4. The elements recited in claim 3, wherein, a portion of the outer surface of each aperture-forming element is recessed relative to an adjoining outer surface.

* * * * *